(12) United States Patent
Jiang et al.

(10) Patent No.: US 12,016,261 B1
(45) Date of Patent: Jun. 25, 2024

(54) EQUIDISTANT HOLE MARKING DEVICE FOR BLUEBERRY CULTIVATION IN SOLAR GREENHOUSE

(71) Applicant: Shihezi University, Shihezi (CN)

(72) Inventors: Ping Jiang, Shihezi (CN); Laiman Su, Shihezi (CN); JianBing Ge, Shihezi (CN); Saiyaremu Halifu, Shihezi (CN); Xiang Huang, Shihezi (CN); Mengyao He, Shihezi (CN)

(73) Assignee: SHIHEZI UNIVERSITY, Shihezi (CN)

( * ) Notice: Subject to any disclaimer, the term of this patent is extended or adjusted under 35 U.S.C. 154(b) by 0 days.

(21) Appl. No.: 18/594,386

(22) Filed: Mar. 4, 2024

Related U.S. Application Data

(63) Continuation of application No. PCT/CN2023/087727, filed on Apr. 12, 2023.

(30) Foreign Application Priority Data

Mar. 22, 2023 (CN) .......................... 202310285005.2

(51) Int. Cl.
*A01C 5/02* (2006.01)
*A01C 5/04* (2006.01)
(Continued)

(52) U.S. Cl.
CPC .................. *A01C 5/04* (2013.01); *A01C 5/02* (2013.01); *A01G 9/243* (2013.01); *A01G 22/05* (2018.02)

(58) Field of Classification Search
CPC .... A01C 5/02; A01C 5/04; A01C 7/02; A01C 7/18
See application file for complete search history.

(56) References Cited

U.S. PATENT DOCUMENTS 40,299 A * 10/1863 West et al. ................ A01C 5/02
111/94
340,211 A * 4/1886 Harris ....................... A01C 5/02
111/106

(Continued)

FOREIGN PATENT DOCUMENTS

CN 215122029 U 12/2021

OTHER PUBLICATIONS

Claims of PCT/CN2023/087727, Apr. 12, 2023.
CNIPA (ISA), Written Opinion for PCT/CN2023/087727, Jul. 22, 2023.

*Primary Examiner* — Jamie L McGowan
(74) *Attorney, Agent, or Firm* — Zhigang Ma (57) ABSTRACT

An equidistant hole marking device for blueberry cultivation in a solar greenhouse is provided, which relates to the field of hole spacing marking technologies. The device includes a trigger rod, and the trigger rod is L-shaped. Four groups of moving rods are disposed outside an inner rod, the moving rods are diamond, and the moving rods are made of a plastic material. A circular pressing member is fixed outside each group of the moving rods, an upper side and a lower side of each circular pressing member are inclined, and the circular pressing members are made of a plastic material. When discharging powder, the moving rods and the circular pressing members are controlled to move inside a storage member, so that caked powder is crushed and discharged smoothly, thereby to improve marking efficiency.

10 Claims, 8 Drawing Sheets

(51) Int. Cl.
*A01G 9/24* (2006.01)
*A01G 22/05* (2018.01)

(56) References Cited

U.S. PATENT DOCUMENTS

| | | | | |
|---|---|---|---|---|
| 1,439,601 A * | 12/1922 | Boop | ............... | A01C 7/02 111/92 |
| 1,564,721 A * | 12/1925 | Tallon | ............... | A01C 5/02 33/669 |
| 2,865,315 A * | 12/1958 | Goldstein | ............... | A01C 5/02 111/95 |
| 4,218,981 A * | 8/1980 | Kelly | ............... | A01C 5/02 111/92 |
| 4,267,782 A * | 5/1981 | Talbott | ............... | A01C 5/02 239/525 |
| 4,736,694 A * | 4/1988 | Kratky | ............... | A01C 11/00 294/51 |
| 4,995,327 A * | 2/1991 | Jeffers, Sr. | ............... | A01C 7/02 111/82 |
| 5,438,940 A * | 8/1995 | Bristow | ............... | A01C 5/02 111/98 |
| 6,142,241 A * | 11/2000 | Finley | ............... | A01C 5/02 172/378 |
| 7,143,703 B2 * | 12/2006 | Gallant | ............... | A01C 5/02 111/92 |
| 8,714,275 B1 * | 5/2014 | Ng | ............... | A01B 1/243 172/354 |
| 11,166,405 B1 * | 11/2021 | Rogers | ............... | A01C 5/02 |
| 2006/0162629 A1 * | 7/2006 | Gallant | ............... | A01C 7/02 111/92 |
| 2006/0272560 A1 * | 12/2006 | Steiner | ............... | A01C 5/02 111/92 |
| 2011/0061882 A1 * | 3/2011 | Broadstone | ............... | A01C 5/02 172/362 |
| 2015/0327432 A1 * | 11/2015 | Kim | ............... | A01C 7/002 111/99 |

* cited by examiner

EQUIDISTANT HOLE MARKING DEVICE FOR BLUEBERRY CULTIVATION IN SOLAR GREENHOUSE

TECHNICAL FIELD

The disclosure relates to the field of hole spacing marking technologies, and more particularly to an equidistant hole marking device for blueberry cultivation in a solar greenhouse.

BACKGROUND

Holes should be dug when cultivating blueberries in a solar greenhouse, and an equidistant hole marking device should be used for marking holes to make hole spacing equal during digging of the holes. And white powder should be discharged for marking when marking the holes.

When using an existing equidistant hole marking device, it is easy to cause excessive sinking of the device when soil is relatively soft, or it is difficult to insert and position the device owning to the large resistance when the soil is relatively hard. The existing equidistant hole marking device is not convenient to operate when controlling discharge of powder for marking, and an overall cost of the device is high. In addition, the powder in the existing equidistant hole marking device is easy to caking after long-term storage, which affects smoothness of the powder discharge and the marking effect.

SUMMARY

In view of this, the disclosure provides an equidistant hole marking device for blueberry cultivation in a solar greenhouse, to solve a problem that when an existing equidistant hole marking device is used, the device is easy to sink excessively when soil is relatively soft, or the device is difficult to insert and position owning to the large resistance when the soil is relatively hard.

The equidistant hole marking device for blueberry cultivation in the solar greenhouse provided by the disclosure includes: a positioning body, a side rod, two guide direction rods, connecting shafts, outer plates, a moving member, a pressing member, a pulling plate, a supporting rod, a pushing plate, a top plate a storage member, a trigger rod, an inner rod, four groups of moving rods, and circular pressing members. A top of the positioning body is cylindrical, a bottom of the positioning body is tapered, and the positioning body is made of a metal material. The side rod is disposed on a side of the positioning body, and two bottom holes are defined on the positioning body and a bottom of the side rod. The two guide direction rods are inserted inside the two bottom holes, respectively. The connecting shafts are connected with the two guide direction rods. The outer plates are disposed on two ends of the two guide direction rods, and the outer plates are tapered. The moving member is L-shaped, an inner end of the moving member is a round tubular structure, and the moving member is sleeved outside the positioning body in a slidable way. The pressing member is connected to the moving member through the pulling plate, the pressing member is U-shaped, a middle position of the pressing member is a circular structure, and the pressing member is sleeved outside the positioning body in a slidable way. The storage member is connected to the moving member through the supporting rod, a top of the storage member is funnel-shaped, a middle of the storage member is round and tubular, and a bottom of the storage member is tapered. The trigger rod is L-shaped, a bottom of an inner end of the trigger rod is a wedge-shaped structure, the trigger rod is made of a metal material, and the trigger rod is fixedly connected to the positioning body. The inner rod is connected to the trigger rod through the pushing plate and the top plate. The four groups of moving rods are disposed outside the inner rod, each moving rod of the four groups of moving rods is diamond, each group of the four groups of moving rods has eight moving rods, the eight moving rods are arranged in a ring shape, and the four groups of moving rods are made of a plastic material. The circular pressing members are fixed outside the four groups of moving rods, respectively; and an upper side and a lower side of an outside of each of the circular pressing members are inclined, the circular pressing members are made of a plastic material, and the outside of each of the circular pressing members defines wedge-shaped grooves arranged annularly.

In an embodiment, a top end of the positioning body is provided with a controlling member, and the controlling member is an epsilon-type structure. The side rod is U-shaped, and the side rod is made of a metal material. The outside of the positioning body is sleeved with a spring, and a top end of the spring is in contact with a bottom of the moving member. A baffle is disposed on the positioning body and located inside the side rod, and a top end of the baffle is in contact with a bottom of the spring. The two bottom holes are circular holes. The two guide direction rods are cylindrical, and the two guide direction rods are made of a metal material. Two ends of a side of each of the connecting shafts are provided with auxiliary rods, respectively; and the auxiliary rods are L-shaped, outer ends of the auxiliary rods are cylindrical structures, and the auxiliary rods are made of a rubber material.

In an embodiment, the end of the moving member defines a guide groove, the guide groove is a rectangular groove, and the side rod is inserted inside the guide groove. The pulling plate is L-shaped, and the pulling plate is made of a metal material. The supporting rod is rectangular, and is a telescopic structure, and a top end of the supporting rod is provided with a telescopic limit member and a guide rod. The guide rod is a T-shaped shaft structure, and an outside of the guide rod is sleeved with a spring. A front end of the supporting rod defines a through groove, and the through groove is a rectangular groove. A side of the storage member defines a moving groove, and the moving groove is an arc-shaped groove.

In an embodiment, an inside of the trigger rod defines a sliding groove, and the sliding groove is a rectangular groove. The pushing plate is inserted inside the sliding groove, and the pushing plate is U-shaped. An outer end of the pushing plate is fixed with the top plate, the top plate is T-shaped, and an outer end of the top plate is an annular structure. The guide rod is inserted inside the outer end of the top plate, and an inner end of the top plate is inserted inside the moving groove. A side of the top plate is provided with a protective plate, the protective plate is an arc-shaped plate structure, and the protective plate is disposed outside the moving groove. The inner rod is cylindrical, and the inner rod is made of a plastic material. A bottom of the inner rod is provided with a sealing head, an upper end and a lower end of the sealing head are tapered, the sealing head is made of a metal material, and the sealing head is inserted inside a bottom of the storage member.

Beneficial effects of the disclosure are as follows.

1. The pressing member is disposed, white powder can be added inside the storage member when using the equidistant hole marking device of the disclosure for equidistant hole marking, then the positioning body is controlled to move to make the bottom of the storage member align with a position of a first hole, and the pressing member is controlled to move downwards to discharge the white powder, to thereby mark the first hole. The supporting rod is adjusted to extend and retract, to thereby adjust hole spacing (i.e., distances among holes). When multiple markings are required, the bottom of the positioning body is controlled to insert to the position of the first hole, and the pressing member is pressed to move downwards, so that the moving member and the storage member move downwards together, the sealing head can move upwards inside the storage member, and the powder can be conveniently discharged for marking, so as to improve convenience of marking, and marking efficiency.

2. The outer plates are disposed, the outer plates on a back end can be controlled to turn over through the connecting shafts to make planes of the outer plates face downwards when using the equidistant hole marking device to mark soft soil. When the positioning body is inserted downwards into the soft soil, the planes of the outer plates are in contact with the soil, which can increase a contact surface between the outer plates and the soil, improve a position effect of the aligned positioning body, and avoid excessive sinking of the positioning body into the soil. When using the equidistant hole marking device to mark hard soil, the outer plates can be controlled to turn over, to make the planes of the outer plates face upwards. The outer plates on the back end are trampled by foot, to apply pressure to the positioning body, so that the bottom of the positioning body can be easily inserted into the hard soil for positioning, so as to improve convenience of the positioning.

3. The moving rods and the circular pressing members are disposed, so that the moving rods and the circular pressing members can be controlled to move inside the storage member when using the equidistant hole marking device for discharging the powder, while moving, the moving rods can assist in pushing the powder, so that caked powder cannot be discharged to generate blockage. When driving the circular pressing members to move together, the powder can be crushed by auxiliary extrusion when the powder passes through due to the inclined structure of the outside of the circular pressing members, so that the caked powder can be crushed, and the powder can be completely and conveniently circulated and discharged, so as to improve the marking efficiency.

BRIEF DESCRIPTION OF DRAWINGS

In order to describe technical solutions of embodiments of the disclosure clearly, drawings of the embodiments will be simply introduced below.

The drawings in the following description are merely some of the embodiments of the disclosure, and are not a limitation of the disclosure.

LIST OF REFERENCE NUMBER

1—positioning body; 101—controlling member; 102—side rod; 103—baffle; 104—bottom hole; 105—guide direction rod; 106—connecting shaft; 107—auxiliary rod; 108—outer plate; 109—spring;

2—moving member; 201—guide groove; 202—pulling plate; 203—pressing member; 204—supporting rod; 205—guide rod; 206—through groove; 207—storage member; 208—moving groove; 209—spring; 210—telescopic limit member;

3—trigger rod; 301—sliding groove; 302—pushing plate; 303—top plate; 304—protective plate; 305—inner rod; 306—sealing head; 307—moving rod; 308—circular pressing member; 309—wedge-shaped groove.

DETAILED DESCRIPTION OF EMBODIMENTS

Implementation methods of the disclosure are further described in detail in conjunction with drawings and embodiments below.

Please refer to FIGS. 1-8 for the embodiments.

The disclosure provides an equidistant hole marking device for blueberry cultivation in a solar greenhouse, which includes a positioning body 1, a controlling member 101, a side rod 102, a baffle 103, two guide direction rods 105, connecting shafts 106, auxiliary rods 107, outer plates 108, a spring 109, a moving member 2, a pulling plate 202, a pressing member 203, a supporting rod 204, a guide rod 205, a storage member 207, a spring 209, a telescopic limit member 210, a trigger rod 3, a pushing plate 302, a top plate 303, a protective plate 304, an inner rod 305, a sealing head 306, four groups of moving rods 307, and circular pressing members 308. A top of the positioning body 1 is cylindrical, and a bottom of the positioning body 1 is tapered, so that the positioning body 1 can be easily inserted into soil for positioning. The positioning body 1 is made of a metal material. The side rod 102 is disposed on a side of the positioning body 1, and two bottom holes 104 are defined on the positioning body 1 and a bottom of the side rod 102. The two guide direction rods 105 are inserted inside the two bottom holes 104, respectively. The connecting shafts 106 are connected with the two guide direction rods 105, so that the outer plates 108 can be freely turned over and adjusted for use through the connecting shafts 106. The outer plates 108 are disposed on two ends of the guide direction rods 108, and the outer plates 108 are tapered, so that the outer plates 108 can be freely turned over and adjusted, and contact areas between the outer plates 108 and soft soil are increased when planes of the outer plates 108 face downwards, so as to avoid subsidence of the positioning body 1, and improve a positioning effect. The planes of the outer plates 108 are controlled to face upwards, which can facilitate trampling, and facilitate insertion of the bottom end of the positioning body 1 into hard soil for positioning. The moving member 2 is L-shaped, an end of the moving member 2 is a round tubular structure, and the moving member 2 is sleeved outside the positioning body 1 in a slidable way, so that the moving member 2 can slide freely for use. The pressing member 203 is connected to the moving member 2 through the pulling plate 202, the pressing member 203 is U-shaped, a middle position of the pressing member 203 is a circular structure, and the pressing member 203 is sleeved outside the positioning body 1 in a slidable way, so that the moving member 2 is easily pressed for moving, the sealing head 306 can be freely moved inside the storage member 207, so as to facilitate powder discharge, and improve convenience of powder discharge. The storage member 207 is connected to the moving member 2 through the supporting rod 204, a top of the storage member 207 is funnel-shaped, a middle of the storage member 207 is round and tubular, and a bottom of the storage member 207 is tapered, which is used to make the sealing head 306 be inserted into the storage member for sealing. The trigger rod 3 is L-shaped, a bottom of an inner end of the trigger rod 3 is a wedge-shaped structure, the trigger rod 3 is made of a metal material, and the trigger rod 3 is fixedly connected to the positioning body 1. The inner rod 305 is connected to the trigger rod 3 through the pushing plate 302 and the top plate 303. The four groups of moving rods 307 are disposed outside the inner rod 305, each moving rod 307 is diamond, and the moving rods 307 are used to connect the circular pressing members 308, meanwhile, the moving rods 307 can assist in blocking caked powder, and prevent the caked powder from being discharged and blocked. Each group of the moving rods 307 has eight moving rods 307, the eight moving rods 307 are arranged in a ring shape, and the moving rods 307 are made of a plastic material. The circular pressing members 308 are fixed outside the four groups of moving rods 307, respectively; an upper side and a lower side of an outside of the circular pressing member 308 are inclined, so that the caked powder can be crushed when the circular pressing members 308 move upwards and downwards. The circular pressing members 308 are made of a plastic material, and the outside of the circular pressing member 308 defines wedge-shaped grooves 309 arranged annularly, which can make the powder easily pass through.

Figure 1:
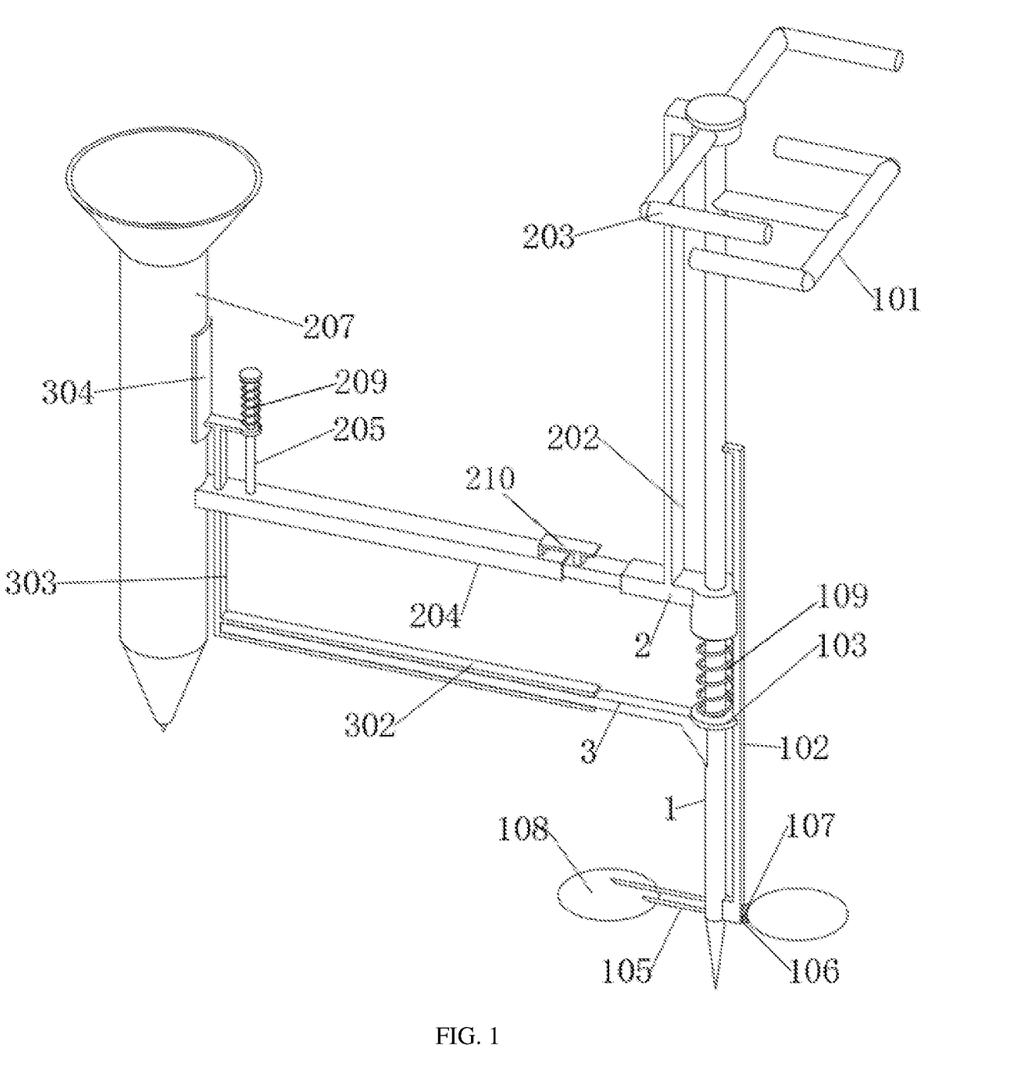
FIG. 1 illustrates a schematic structural diagram of an equidistant hole marking device according to an embodiment of the disclosure.
Figure 2:
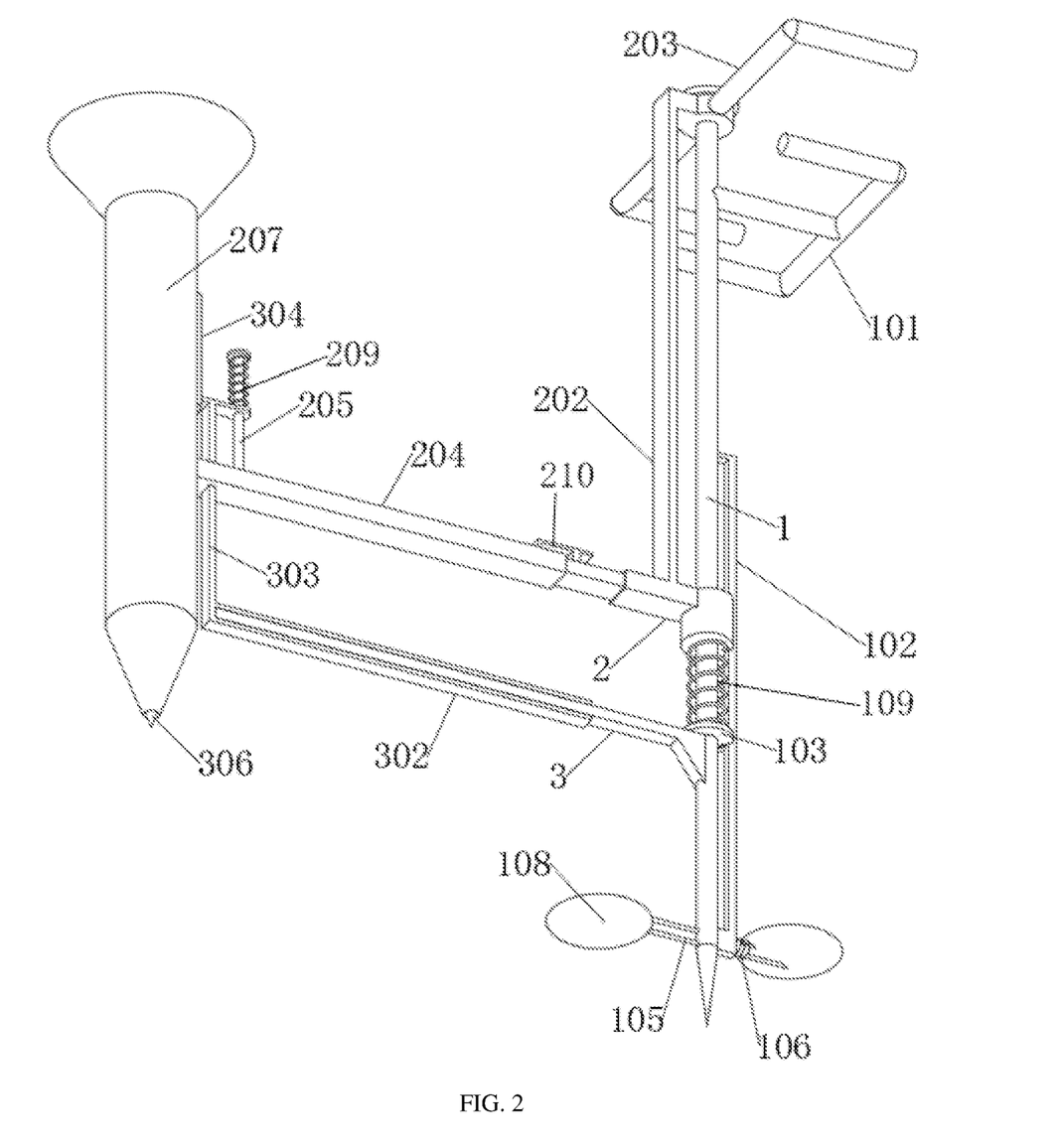
FIG. 2 illustrates a schematic structural diagram from a down-top perspective of the equidistant hole marking device according to an embodiment of the disclosure.
Figure 3:
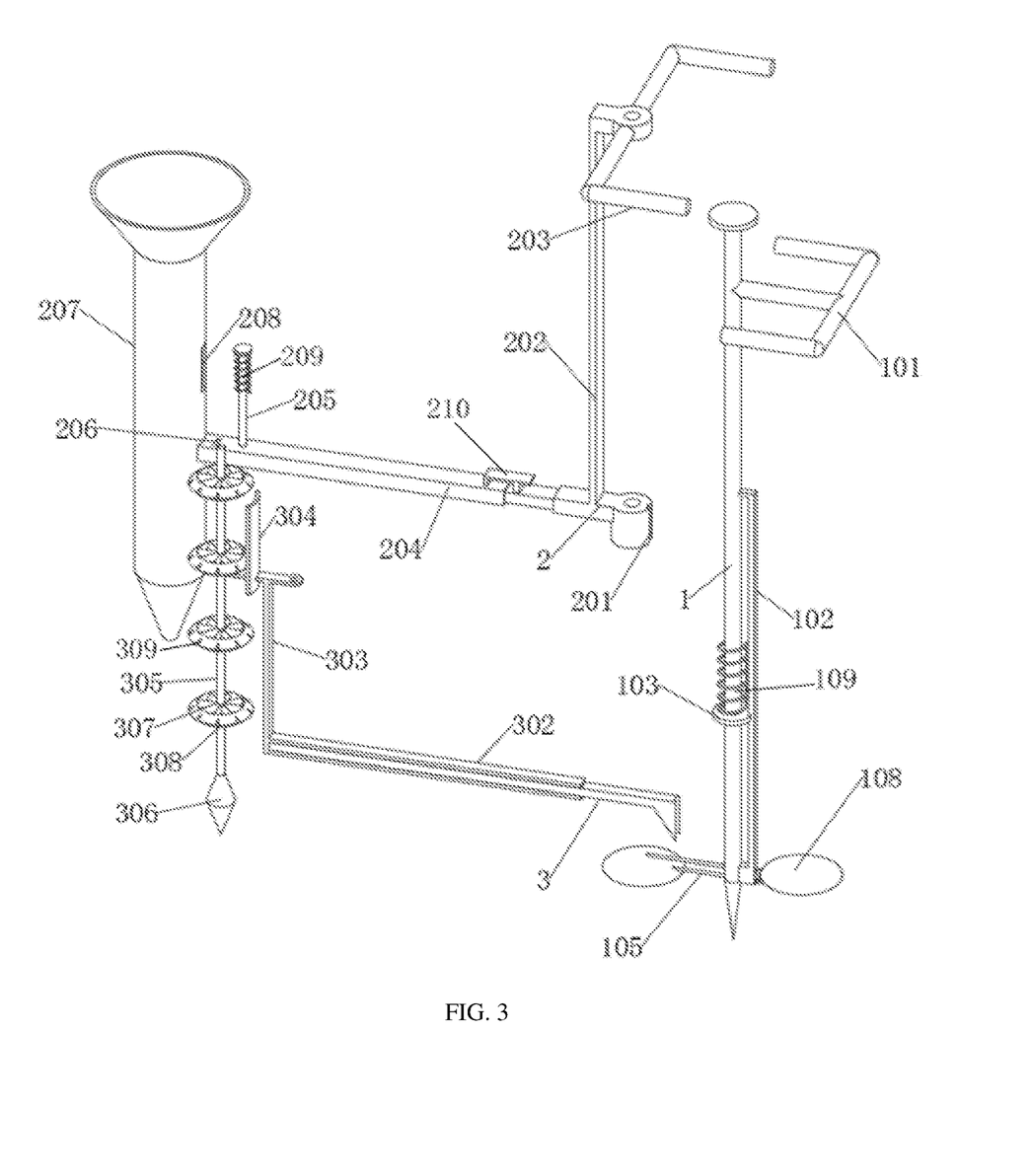
FIG. 3 illustrates an exploded schematic structural diagram of the equidistant hole marking device according to an embodiment of the disclosure.
Figure 4:
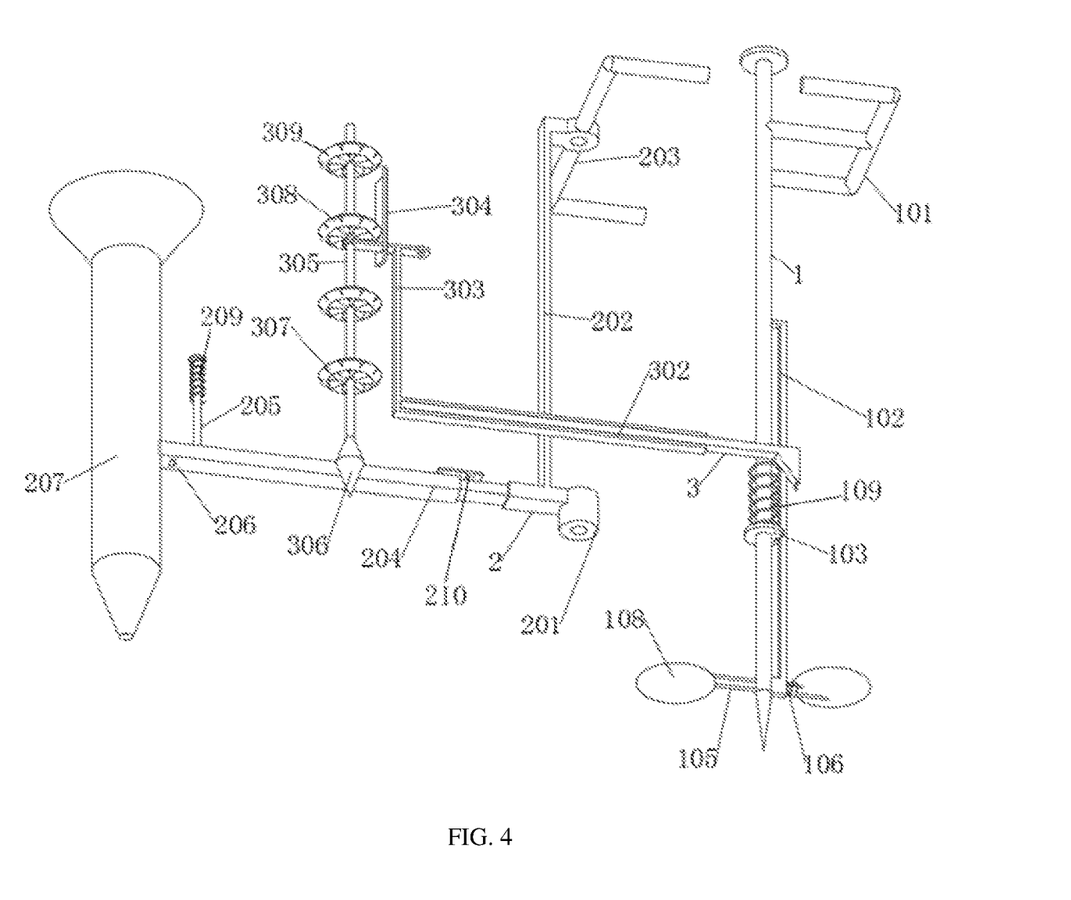
FIG. 4 illustrates an exploded schematic structural diagram from the down-top perspective of the equidistant hole marking device according to an embodiment of the disclosure.
Figure 5:
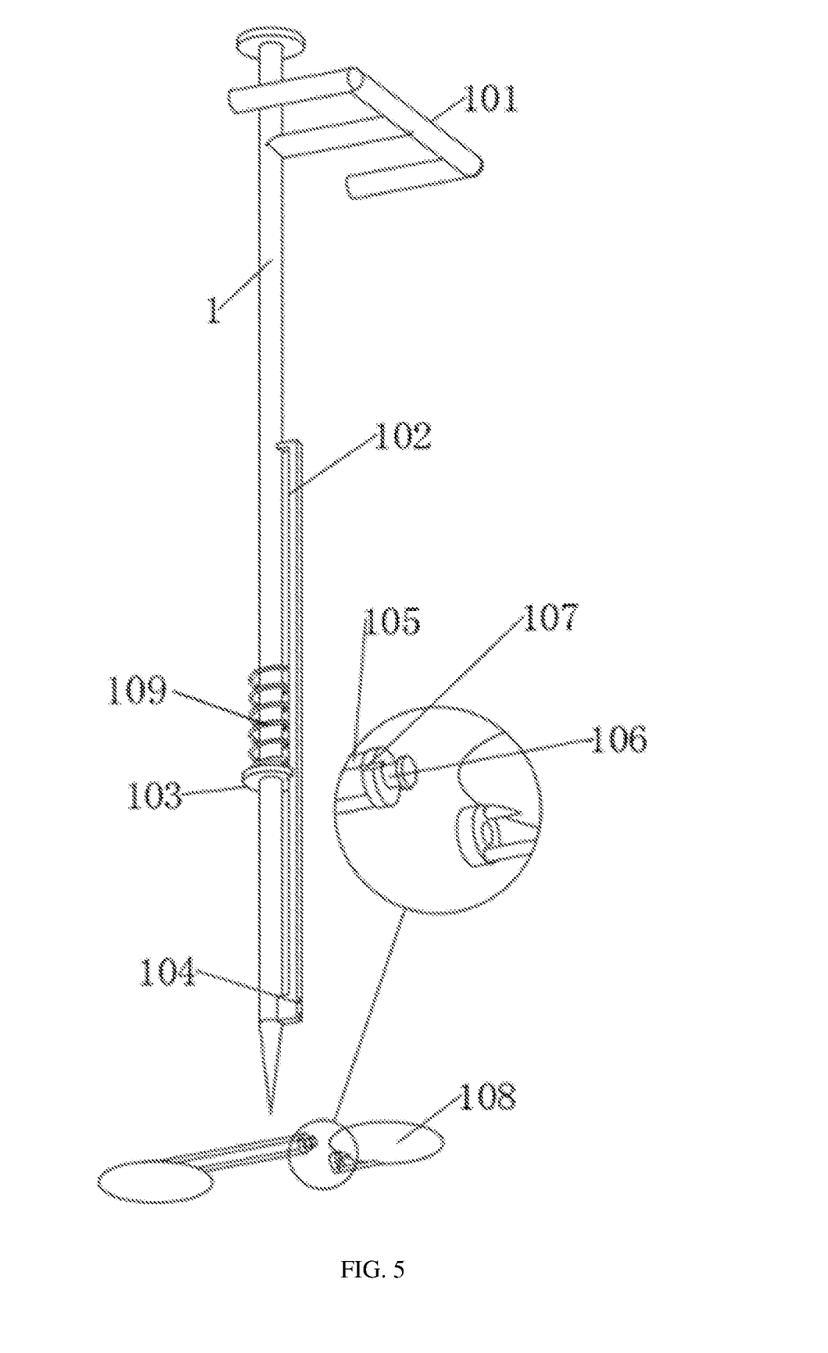
FIG. 5 illustrates an exploded and partially enlarged schematic diagram of a part of the equidistant hole marking device including a positioning body according to an embodiment of the disclosure.

As shown in FIG. 5, a top end of the positioning body 1 is provided with the controlling member 101, and the controlling member 101 is an epsilon-type structure, which can assist in manipulating the positioning body 1. The side rod 102 is U-shaped, the side rod 102 is made of a metal material, and the side rod 102 is used to be inserted inside a guide groove 201, so that the moving member 2 can be guided to move without rotating. The outside of the positioning body 1 is sleeved with the spring 109, a top end of the spring 109 is in contact with a bottom of the moving member 2, so that the spring 109 can push the moving member 2 to reset. The baffle 103 is disposed on the positioning body 1 and located inside the side rod 102, a top end of the baffle 103 is in contact with a bottom of the spring 109, and the baffle 103 is used to support the spring 109 for use. The two bottom holes 104 are circular holes, so that the guide direction rods 105 can move inside the two bottom holes 104. The guide direction rods 105 are cylindrical, and the guide direction rods 105 are made of a metal material, so as to support and connect the outer plates 108. Two ends of a side of each connecting shaft 106 are provided with the auxiliary rods 107, respectively. The auxiliary rods 107 are L-shaped, outer ends of the auxiliary rods 107 are cylindrical structures, and the auxiliary rods 107 are made of a rubber material, so that the connecting shafts 106 can be fixed in an anti-skid way after the connecting shafts 106 rotate.

Figure 6:
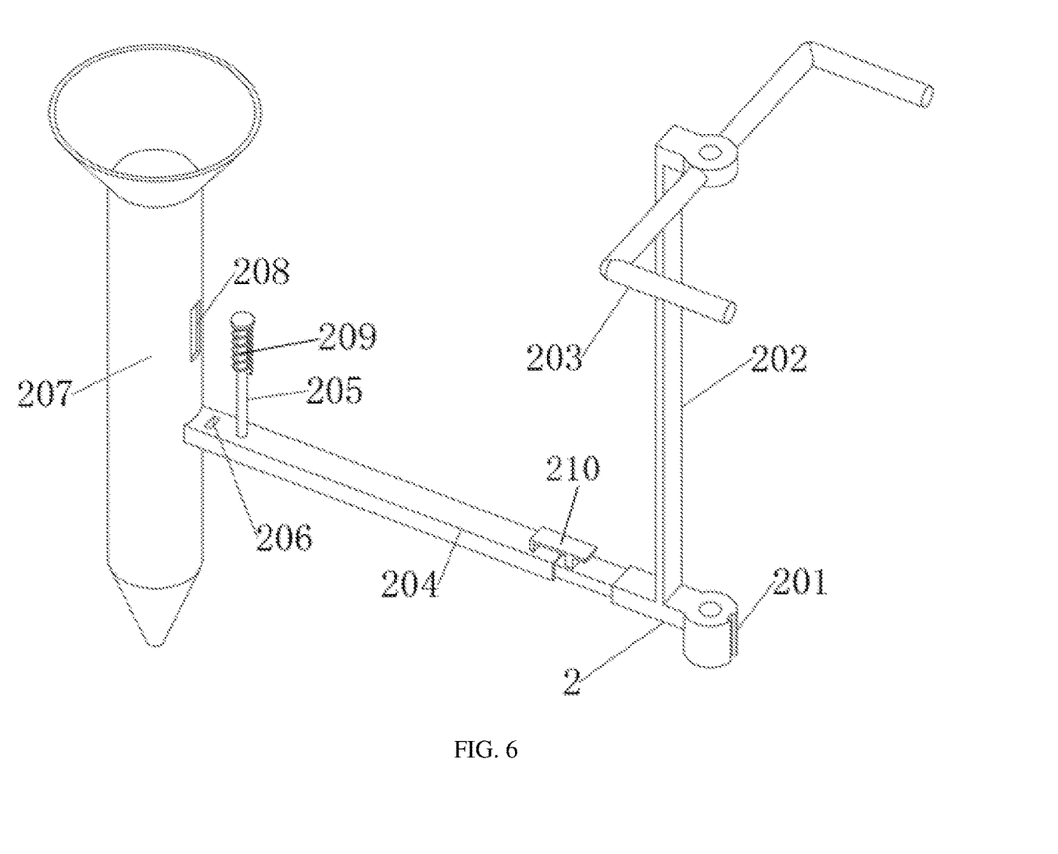
FIG. 6 illustrates a schematic structural diagram of a part of the equidistant hole marking device including a moving member according to an embodiment of the disclosure.

As shown in FIG. 6, the end of the moving member 2 defines the guide groove 201, and the guide groove 201 is a rectangular groove. The side rod 102 is inserted inside the guide groove 201, so that the moving member 2 can be guided and moved. The pulling plate 202 is L-shaped, and the pulling plate 202 is made of a metal material, so as to conveniently transmit power. The supporting rod 204 is rectangular, and is a telescopic structure, so as to freely adjust hole spacing. A top end of the supporting rod 204 is provided with the telescopic limit member 210, so that the supporting rod 204 can be fixed after extending and retracting. The top end of the supporting rod 204 is provided with the guide rod 205, the guide rod 205 is a T-shaped shaft structure, and an outside of the guide rod 205 is sleeved with the spring 209, and the spring 209 is used to assist in pushing the top plate 303 up. A front end of the supporting rod 204 defines a through groove 206, and the through groove 206 is a rectangular groove, so that the top plate 303 can be displaced inside the through groove 206. A side of the storage member 207 defines a moving groove 208, and the moving groove 208 is an arc-shaped groove, so that the top plate 303 can be guided and moved inside the moving groove 208.

Figure 7:
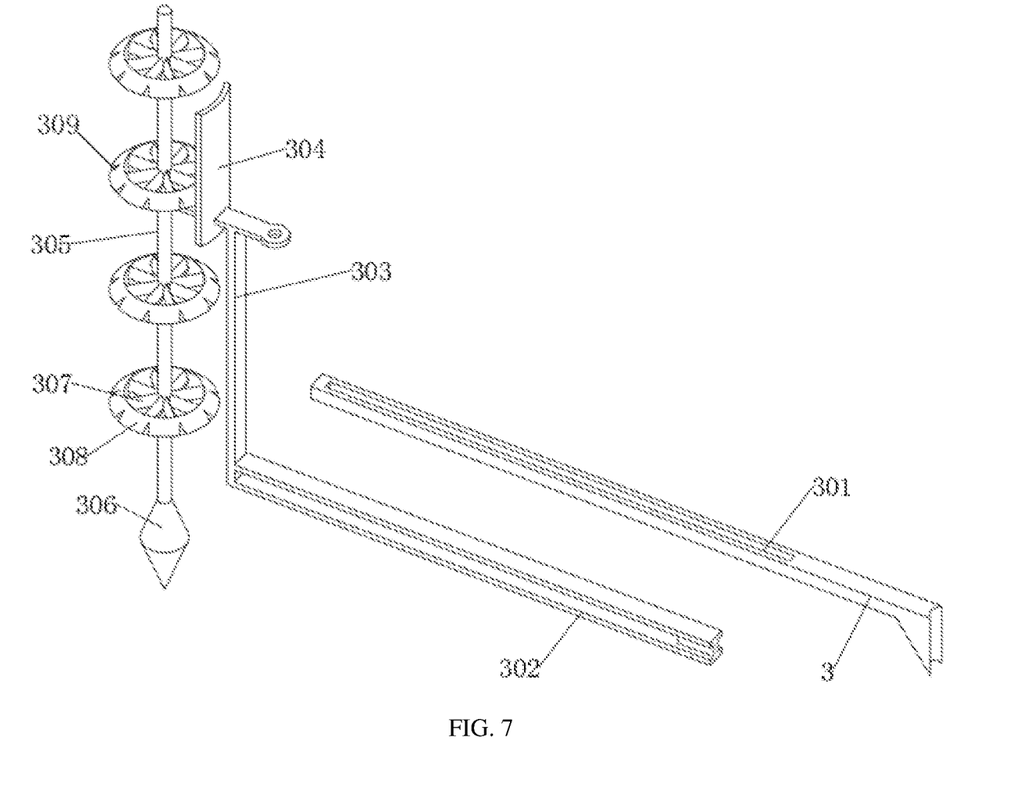
FIG. 7 illustrates an exploded schematic structural diagram of a part of the equidistant hole marking device including a trigger rod according to an embodiment of the disclosure.
Figure 8:
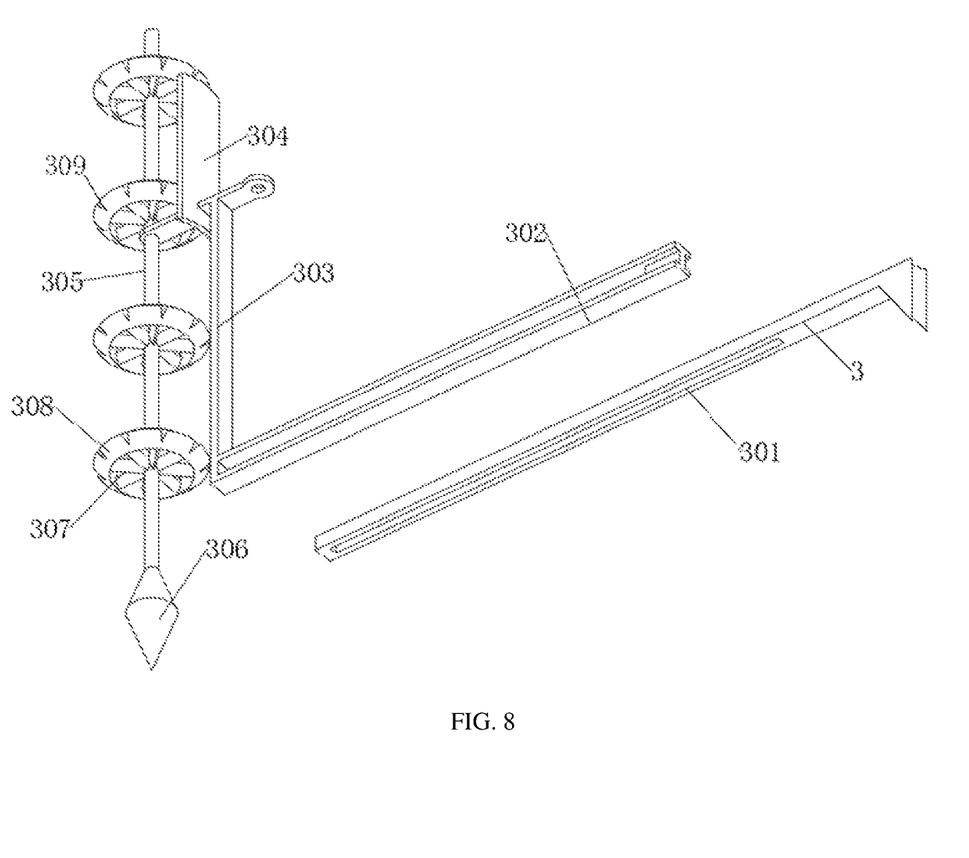
FIG. 8 illustrates an exploded schematic structural diagram from a down-top perspective of the part of the equidistant hole marking device including the trigger rod according to an embodiment of the disclosure.

As shown in FIG. 7 and FIG. 8, an inside of the trigger rod 3 defines a sliding groove 301, and the sliding groove 301 is a rectangular groove. The pushing plate 302 is inserted inside the sliding groove 301, so that the pushing plate 302 can freely slide along with the supporting rod 204 to adjust the hole spacing. The pushing plate 302 is U-shaped. An outer end of the pushing plate 302 is fixed with the top plate 303, the top plate 303 is T-shaped, which is used for supporting and connecting other components, and transmitting the power. An outer end of the top plate 303 is an annular structure. The guide rod 205 is inserted inside the outer end of the top plate 303, and an inner end of the top plate 303 is inserted inside the moving groove 208. A side of the top plate 303 is provided with the protective plate 304, the protective plate 304 is arc-shaped, and the protective plate 304 is disposed outside the moving groove 208, so that the protective plate 304 can be used for external protection of the moving groove 208, so as to avoid leakage of the powder. The inner rod 305 is cylindrical, and the inner rod 305 is made of a plastic material. A bottom of the inner rod 305 is provided with the sealing head 306, an upper end and a lower end of the sealing head 306 are tapered, the sealing head 306 is made of a metal material, and the sealing head 306 is inserted inside a bottom of the storage member 207 for sealing.

Specific usage methods and effects of the embodiment are as follows. In the disclosure, when the device needs to be used, the powder can be added inside the storage member 207 through manpower control, then the positioning body 1 is inserted into the soil through the manpower control, and the pressing member 203 is pressed downwards to discharge the powder, so that a first hole is marked. The positioning body 1 is controlled to move, so that the bottom of the positioning body 1 can be inserted into a position of the first marked hole. The outer plates 108 are controlled to turn over through the connecting shafts 106 when the soil is relatively soft, so that the planes of the outer plates 108 face downwards, so as to increase the contact areas between the outer plates and the soil, improve support effect for the positioning body 1, and avoid the positioning body 1 from sinking into the soil. The planes of the outer plates 108 are controlled to face upwards when the soil is relatively hard, then the planes of the outer plates 108 are trampled by the foot, so that the bottom of the positioning body 1 can be inserted into the soil, so as to facilitate positioning. The supporting rod 204 is controlled to move to adjust length of the supporting rod 204, so that a position of the storage member 207 can be adjusted, so as to adjust the hole spacing. The supporting rod 204 is fixed to make the storage member 207 to be placed in a next hole position. The pressing member 203 is pressed to make the moving member 2 and the supporting rod 204 can be moved downwards, so that the top plate 303 can compress the spring 209, the sealing head 306 can be moved upwards inside the storage member 207, and the bottom inside the storage member 207 can be opened, so as to easily discharge the powder for marking, and improve convenience of operation. When the sealing head 306 moves, the moving rods 307 and the circular pressing members 308 are driven to reciprocate together, so that the moving rods 307 can block the caked powder. The circular pressing members 308 can assist in pressing and crushing the caked powder, so that the powder can be discharged smoothly, so as to avoid blockage. The positioning body 1 is controlled to move, so that the bottom of the positioning body 1 can be inserted into a position of a second marked hole. The device is operated through a same method, so that the device can equidistantly mark the holes.

What is claimed is:

1. An equidistant hole marking device for blueberry cultivation in a solar greenhouse, comprising:
    a positioning body; wherein a top of the positioning body is cylindrical, a bottom of the positioning body is tapered, and the positioning body is made of a metal material;
    a side rod, disposed on a side of the positioning body; wherein two bottom holes are defined on the positioning body and a bottom of the side rod;
    two guide direction rods, inserted inside the two bottom holes, respectively;
    connecting shafts, connected with the two guide direction rods;
    outer plates, disposed on two ends of the two guide direction rods; wherein the outer plates are tapered;
    a moving member; wherein the moving member is L-shaped, an end of the moving member is a round tubular structure, and the moving member is sleeved outside the positioning body in a slidable way;
    a pressing member, connected to the moving member through a pulling plate; wherein the pressing member is U-shaped, a middle position of the pressing member is a circular structure, and the pressing member is sleeved outside the positioning body in a slidable way;
    a storage member, connected to the moving member through a supporting rod; wherein a top of the storage member is funnel-shaped, a middle of the storage member is round and tubular, and a bottom of the storage member is tapered;
    a trigger rod; wherein the trigger rod is L-shaped, a bottom of an inner end of the trigger rod is a wedge-shaped structure, the trigger rod is made of a metal material, and the trigger rod is fixedly connected to the positioning body;
    an inner rod, connected to the trigger rod through a pushing plate and a top plate;
    four groups of moving rods, disposed outside the inner rod; wherein each moving rod of the four groups of moving rods is diamond, each group of the four groups of moving rods has eight moving rods, the eight moving rods are arranged in a ring shape, and the four groups of moving rods are made of a plastic material; and
    circular pressing members, fixed outside the four groups of moving rods, respectively; wherein an upper side and a lower side of an outside of each of the circular pressing members are inclined, the circular pressing members are made of a plastic material, and the outside of each of the circular pressing members defines wedge-shaped grooves arranged annularly.

2. The equidistant hole marking device for blueberry cultivation in the solar greenhouse as claimed in claim 1, wherein a top end of the positioning body is provided with a controlling member, and the controlling member is an epsilon-type structure; and the side rod is U-shaped, and the side rod is made of a metal material.

3. The equidistant hole marking device for blueberry cultivation in the solar greenhouse as claimed in claim 1, wherein the outside of the positioning body is sleeved with a spring, and a top end of the spring is in contact with a bottom of the moving member; a baffle is disposed on the positioning body and located inside the side rod, and a top end of the baffle is in contact with a bottom of the spring; and the two bottom holes are circular holes.

4. The equidistant hole marking device for blueberry cultivation in the solar greenhouse as claimed in claim 1, wherein the two guide direction rods are cylindrical, and the two guide direction rods are made of a metal material; two ends of a side of each of the connecting shafts are provided with auxiliary rods, respectively; and the auxiliary rods are L-shaped, outer ends of the auxiliary rods are cylindrical structures, and the auxiliary rods are made of a rubber material.

5. The equidistant hole marking device for blueberry cultivation in the solar greenhouse as claimed in claim 1, wherein the end of the moving member defines a guide groove, the guide groove is a rectangular groove, and the side rod is inserted inside the guide groove; and the pulling plate is L-shaped, and the pulling plate is made of a metal material.

6. The equidistant hole marking device for blueberry cultivation in the solar greenhouse as claimed in claim 1, wherein the supporting rod is rectangular, and is a telescopic structure; a top end of the supporting rod is provided with a telescopic limit member and a guide rod; and the guide rod is a T-shaped shaft structure, and an outside of the guide rod is sleeved with a spring.

7. The equidistant hole marking device for blueberry cultivation in the solar greenhouse as claimed in claim 6, wherein a front end of the supporting rod defines a through groove, and the through groove is a rectangular groove; and a side of the storage member defines a moving groove, and the moving groove is an arc-shaped groove.

8. The equidistant hole marking device for blueberry cultivation in the solar greenhouse as claimed in claim 7, wherein an inside of the trigger rod defines a sliding groove, and the sliding groove is a rectangular groove; and the pushing plate is inserted inside the sliding groove, and the pushing plate is U-shaped.

9. The equidistant hole marking device for blueberry cultivation in the solar greenhouse as claimed in claim 8, wherein an outer end of the pushing plate is fixed with the top plate, the top plate is T-shaped, and an outer end of the top plate is an annular structure; the guide rod is inserted inside the outer end of the top plate, and an inner end of the top plate is inserted inside the moving groove; and a side of the top plate is provided with a protective plate, the protective plate is an arc-shaped plate structure, and the protective plate is disposed outside the moving groove.

10. The equidistant hole marking device for blueberry cultivation in the solar greenhouse as claimed in claim 9, wherein the inner rod is cylindrical, and the inner rod is made of a plastic material; and a bottom of the inner rod is provided with a sealing head, an upper end and a lower end of the sealing head are tapered, the sealing head is made of a metal material, and the sealing head is inserted inside a bottom of the storage member.

\* \* \* \* \*